United States Patent [19]

Steigerwald

[11] Patent Number: 4,504,895
[45] Date of Patent: Mar. 12, 1985

[54] REGULATED DC-DC CONVERTER USING A RESONATING TRANSFORMER

[75] Inventor: Robert L. Steigerwald, Scotia, N.Y.

[73] Assignee: General Electric Company, Schenectady, N.Y.

[21] Appl. No.: 438,828

[22] Filed: Nov. 3, 1982

[51] Int. Cl.³ .......................................... H02P 13/22
[52] U.S. Cl. ....................................... 363/17; 363/25; 363/132; 378/112
[58] Field of Search ........................ 363/17, 21, 25, 68, 363/132, 134; 378/104, 111, 112

[56] References Cited

U.S. PATENT DOCUMENTS

| | | | |
|---|---|---|---|
| 2,611,096 | 9/1952 | Wright et al. | 378/112 |
| 2,748,292 | 5/1956 | Worden | 378/111 |
| 3,295,041 | 12/1966 | Bize | 363/19 |
| 4,054,827 | 10/1977 | Reimers | 363/28 |
| 4,295,049 | 10/1981 | Ebersberger et al. | 378/112 |
| 4,361,901 | 11/1982 | Daniels et al. | 378/112 |
| 4,415,959 | 11/1983 | Vinciarelli | 363/21 |

FOREIGN PATENT DOCUMENTS 112878 9/1981 Japan ..................................... 363/17

OTHER PUBLICATIONS

Schwarz, "A 95-Percent Efficient 1-kw DC Converter with an Internal Frequency of 50kHZ," IEEE Transactions on Industrial Electronics and Control Instrumentation, vol. IEC1-25, No. 4, pp. 326-333, Nov. 1978.

Mamon et al., "A Resonant Converter with PWM Control," Conference, Intelec. 81, Third International Telecommunications Energy Conference, London, England, pp. 247-249, (19-21 May 1981).

"Electronics" Jun. 16, 1981, Issue "The Supply Specifier has a Basic Choice," pp. 108-114 (pp. 111 and 113 are full page advertisements and not included).

Primary Examiner—William H. Beha, Jr.
Attorney, Agent, or Firm—Mark L. Mollon; James C. Davis, Jr.; Marvin Snyder

[57] ABSTRACT

A resonant dc-dc converter employing power transistors as the switching elements generates a high dc output voltage (150 kilovolts) to drive an X-ray tube. The converter is configured such that the resonating circuit elements can be realized using the transformer parasitic elements. Voltage step up is achieved due to the transformer turns ratio as well as the resonant rise of voltage across the energy storage elements of a series resonant circuit.

6 Claims, 11 Drawing Figures

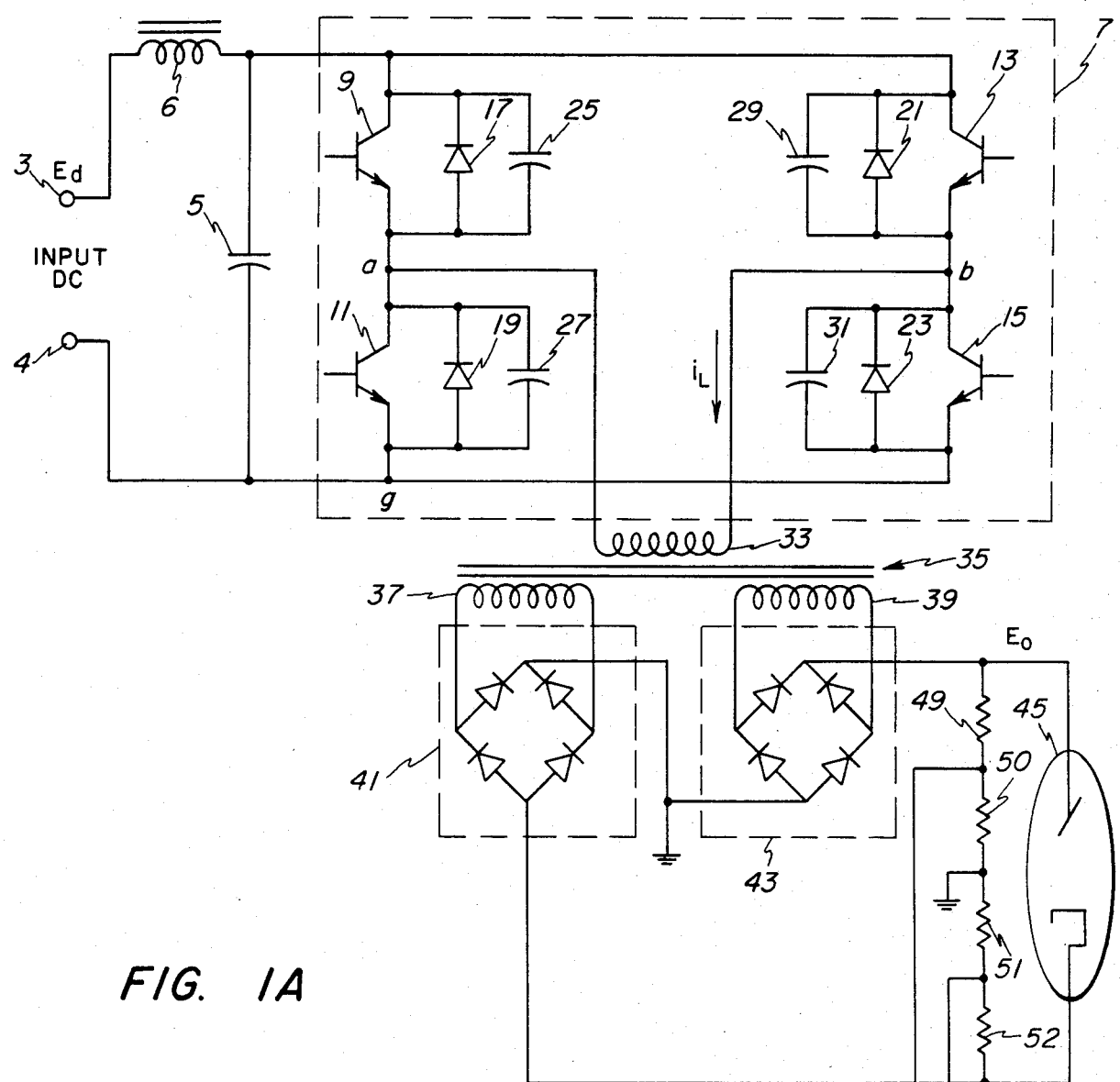
FIG. 1A
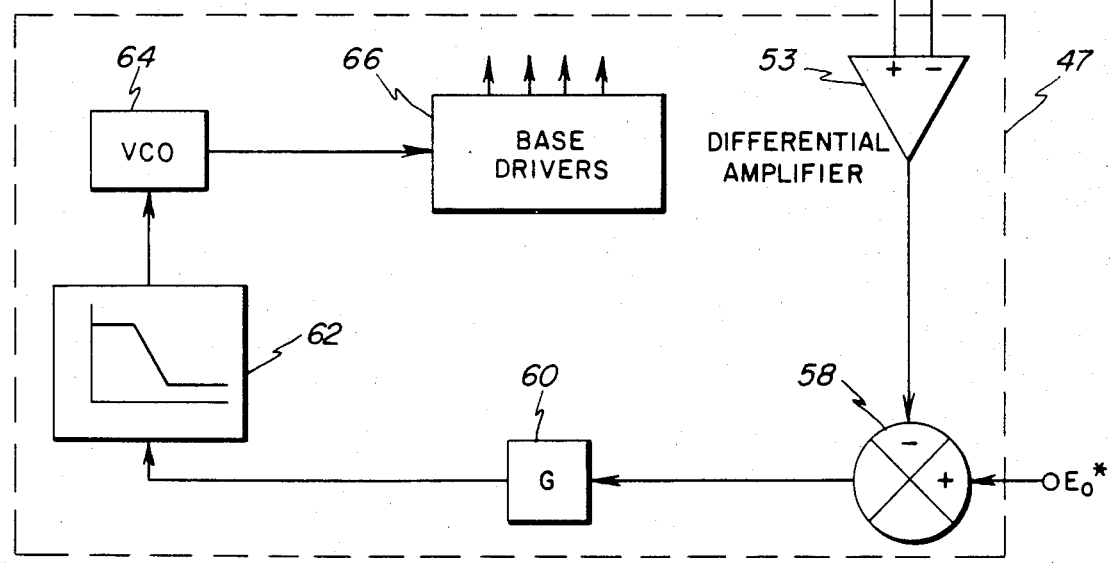

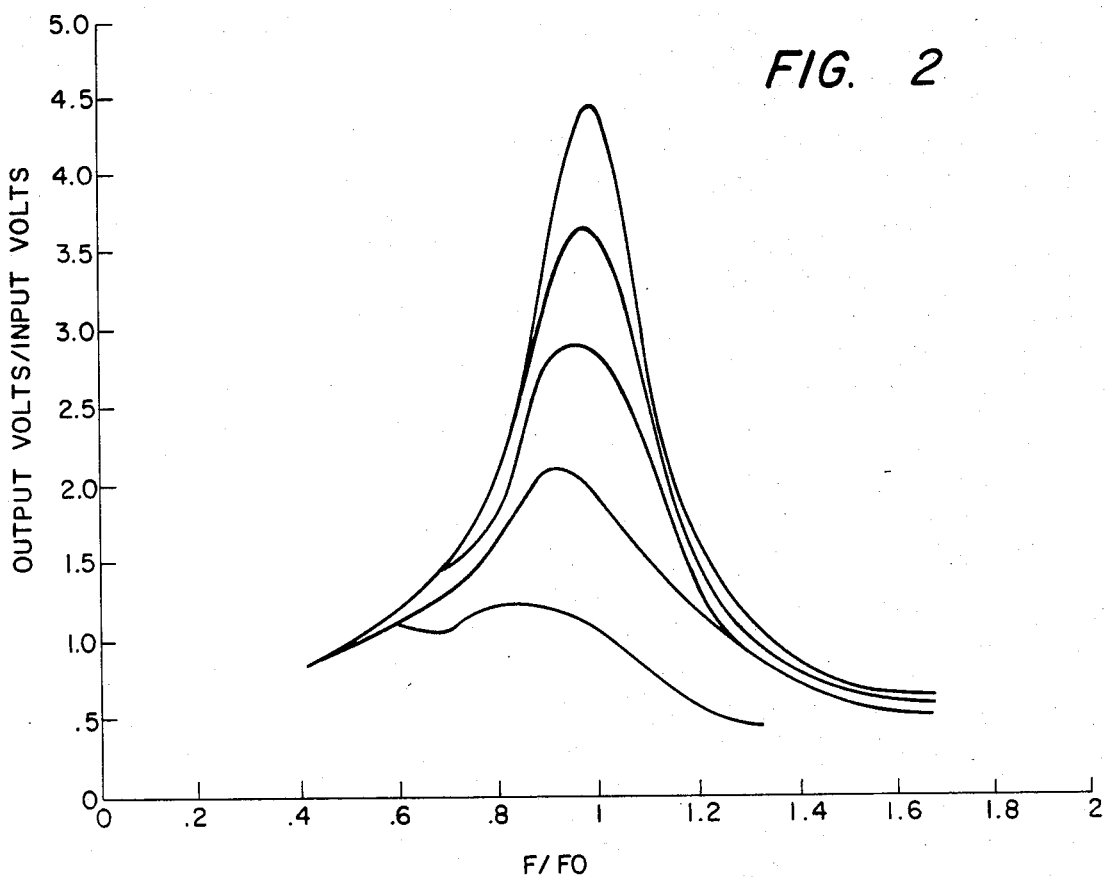
FIG. 2
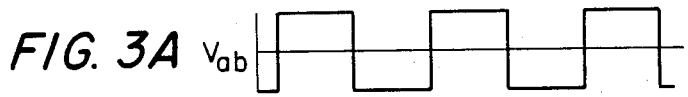
FIG. 3A  $V_{ab}$
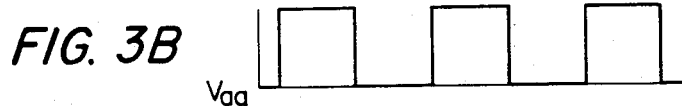
FIG. 3B  $V_{ag}$
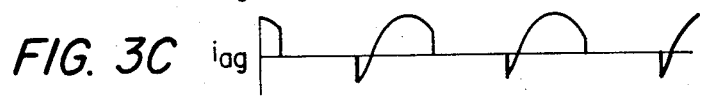
FIG. 3C  $i_{ag}$
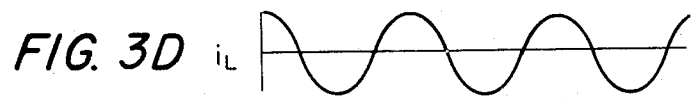
FIG. 3D  $i_L$
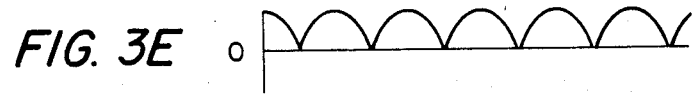
FIG. 3E  o

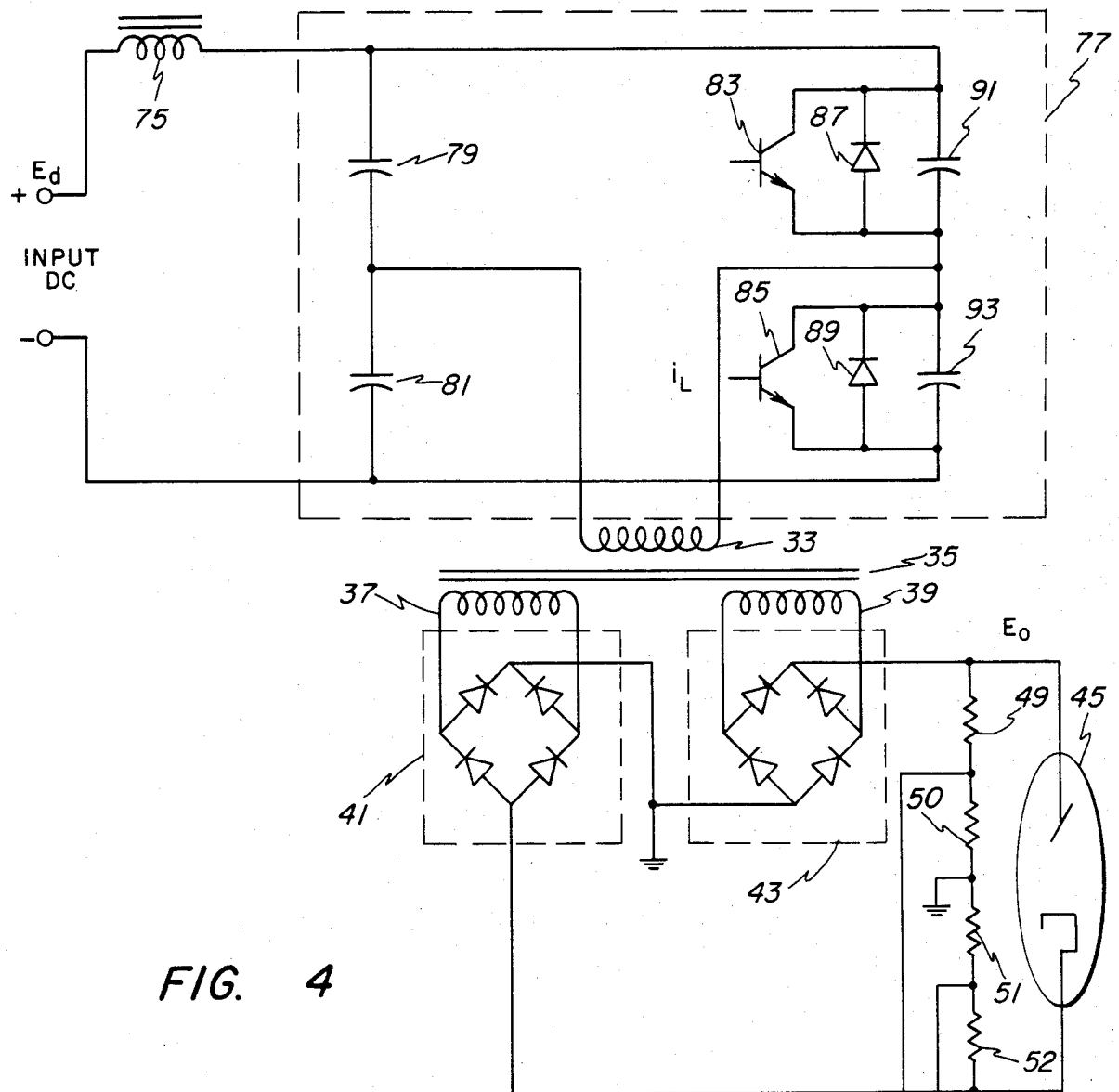
FIG. 4
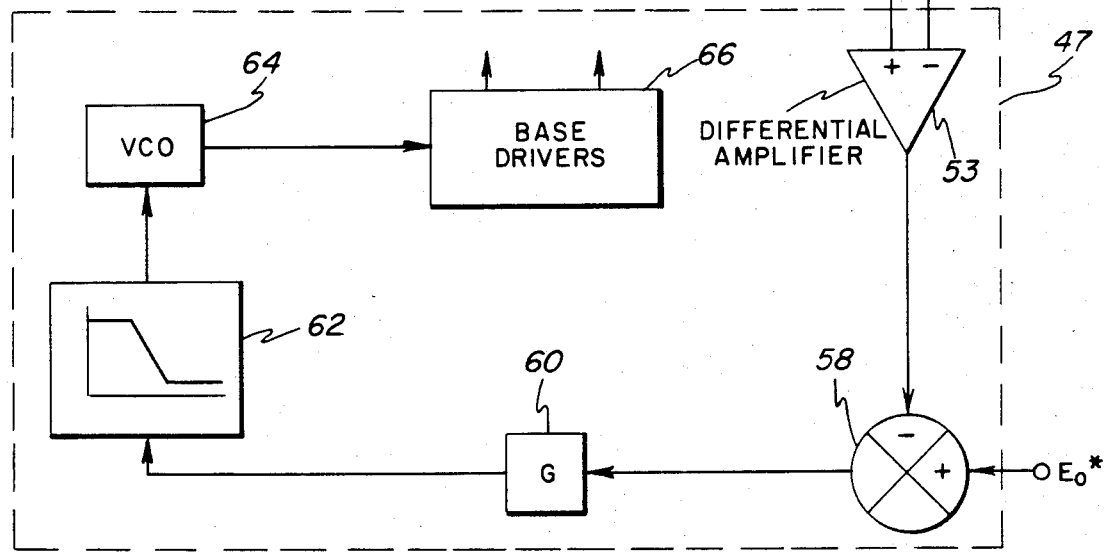

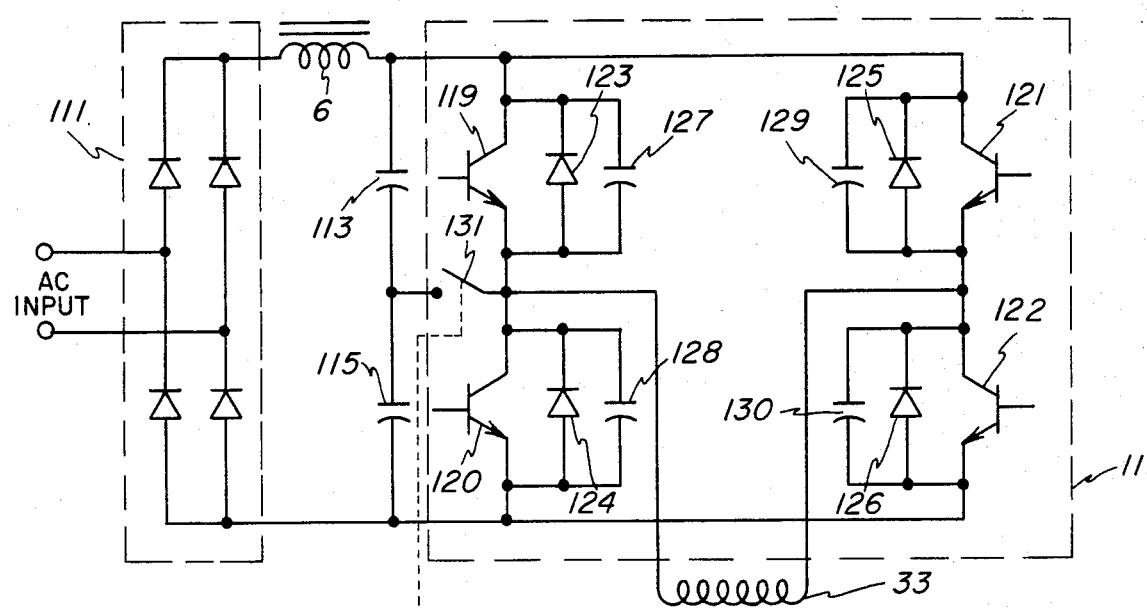
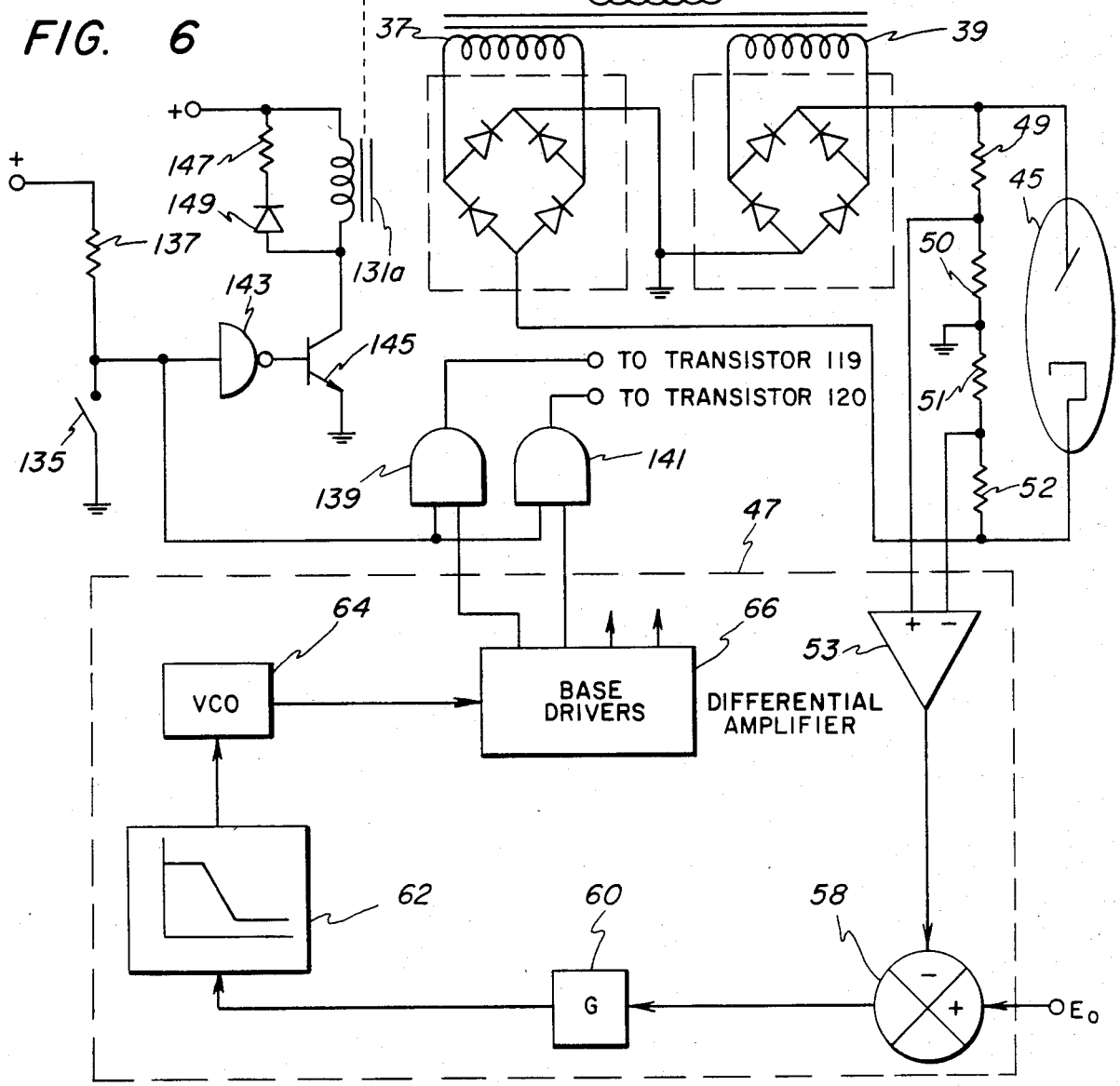
FIG. 6

REGULATED DC-DC CONVERTER USING A RESONATING TRANSFORMER

CROSS-REFERENCES TO RELATED APPLICATIONS

This application is related to my copending applications Ser. Nos. 429,760 and 429,761, filed Sept. 30, 1982 and assigned to the same assignee as the instant invention.

BACKGROUND OF THE INVENTION

This invention relates to adjustable high voltage power supplies and more particularly dc-dc resonant converters suitable for powering X-ray tubes.

High voltage adjustable power supplies with a power output from a few hundred watts for applications such as dental X-rays to the 100 kilowatt range for diagnostic modalities such as computer tomography and X-ray fluorography, are used to energize X-ray tubes. A power supply with low weight, low output ripple to reduce filtering requirements and fast speed of response to accurately set exposures is desirable. Conventional power supplies of the single and three phase versions for energizing X-ray tubes use 60 Hertz adjustable autotransformers to supply adjustable voltages to a step-up 60 Hertz transformer. The 60 Hertz transformers are bulky and the prior art circuits have high output ripple and slow response.

U.S. Pat. No. 4,295,049, of Ebersberger et al, discloses a resonant circuit using silicon controlled rectifiers (SCRs). The resonant circuit is not configured to take advantage of the capacitance built into the transformer. Also, voltage control is achieved by a phase controlled rectifier front end since only limited voltage control can be achieved by lowering the SCRs frequency. The frequency can only be lowered from resonance and not raised above resonance since a leading load is needed to maintain SCR commutation. Operation at frequencies below resonance results in increased output ripple and requires the transformer to be designed for the lowest operating frequency to be encountered. The lower the frequency the larger the reactive components required.

It is an object of the present invention to provide a high dc output voltage from a converter having a low weight compared to designs using 60 Hertz transformers.

It is a further object of the present invention to provide a high dc output voltage from a converter with low output ripple and fast speed of response.

It is another object of the present invention to minimize the number of power components required in a high dc output voltage converter of a given rating and thereby increase reliability and achieve lower cost.

BRIEF SUMMARY OF THE INVENTION

In one aspect of the present invention a dc to ac voltage step-up step-down converter is provided having a first means for supplying ac output power at a commanded frequency from dc input power. A transformer receives the ac power from the first means and provides a transformed ac output voltage. A control responsive to a commanded voltage magnitude provides a frequency command to the first means to adjust the input frequency to the transformer and thereby control the output voltage of the transformer. The frequency of power supplied to the transformer is selected to cause the transformer shunt capacitance and leakage inductance to resonate and achieve voltage transformation due to the turns ratio of the transformer and the resonant change in voltage across the shunt capacitance of the resonant circuit.

In another aspect of the present invention a high voltage dc to dc resonant converter is provided having a voltage input inverter feeding a high frequency transformer. The output of the transformer is connected to a rectifier circuit which provides high voltage dc to a load. The transformer is supplied high frequency square waves of voltage from the inverter which operates at or above the transformer's shunt capacitance and leakage reactance damped resonant frequency. Voltage step up in the converter is due to the turns ratio of the transformer and the resonant rise in voltage across the shunt capacitance of the resonant circuit.

BRIEF DESCRIPTION OF THE DRAWING

While the specification concludes with claims particularly pointing out and distinctly claiming the present invention, the objects and advantages of the invention can be more readily ascertained from the following description of preferred embodiments when used in conjunction with the accompanying drawing in which:

FIG. 1A is a part block diagram, part schematic representation of a resonant dc to dc converter in accordance with the present invention.

FIG. 2 is a graph showing the ratio of the output voltage to the input voltage of the circuit of FIG. 1A due only to the resonant voltage transformation (not the transformer turns ratio) versus frequency for several load impedances;

FIGS. 3A-E are waveform diagrams helpful in explaining the operation of the converter of FIG. 1A;

FIG. 4 is another embodiment of a resonant dc to dc converter employing a half bridge inverter;

FIG. 6 is yet another embodiment of the present invention capable of supplying different ranges of output voltage.

DETAILED DESCRIPTION OF THE INVENTION

Figure 1B:
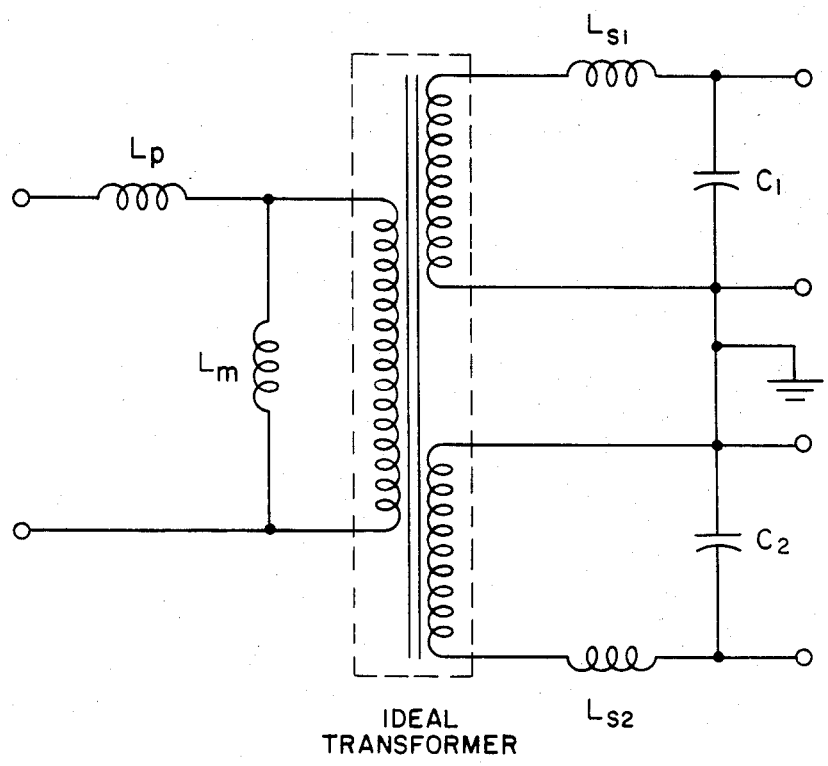
FIG. 1B is an equivalent circuit of the transformer used in FIG. 1A.

Referring now to the drawing wherein like numerals designate like elements, there is shown in FIG. 1A a resonant dc to dc converter. DC power is provided from an external source (not shown) at terminals 3 and 4. Connected between terminal 3 and one end of a high frequency capacitance filter 5 is a 120 cycle inductive filter 6. The other end of capacitance filter 5 is connected to terminal 4. A full bridge inverter 7 is provided having four switching devices that are capable of carrying reverse current and capable of being turned off by a switching signal. The switching devices are shown as bipolar junction power transistors 9, 11, 13 and 15 each having an inverse diode 17, 19, 21 and 23 connected in parallel, respectively. Other switching devices with gate turn-off capability which could be used instead of the parallel-connected transistor-diode combinations are power metal-oxide semiconductor field effect transistors (MOSFETs) (reverse current carried by a parasitic diode), monolithic Darlingtons (reverse current carried by a parasitic diode) and gate turn-off silicon controlled rectifiers each in inverse parallel with a diode. Power transistors 9 and 11 are connected in series with one another across capacitor 5 as are power transistors 13 and 15. The output of inverter 7 is available across the junctions a and b between series connected transistors 9 and 11, and series connected transistors 13 and 15, respectively. Snubbers comprising snubber capacitors 25, 27, 29 and 31 are each connected across respective transistors 9, 11, 13 and 15.

A primary winding 33 of a high frequency high voltage step-up transformer 35 operating typically at 5-30 KHz, is connected between junctions a and b in inverter 7. The transformer 35 has two secondary windings 37 and 39. A high voltage full bridge diode rectifier 41 is connected across secondary winding 37 and a high voltage full bridge diode rectifier 43 is connected across the secondary winding 39. The outputs of the two bridge rectifiers 41 and 43 are connected in series with one another, with the junction of the two rectifiers grounded to reduce insulation to ground requirements of the transformer and to facilitate voltage and current measurement for control purposes. The two rectifiers supply a load shown in FIG. 1A as an X-ray tube 45.

A control 47 has as an input a commanded dc voltage $E_o^*$ for the dc-dc converter and a feedback output voltage signal proportional to $E_0$. The output voltage signal is obtained from a voltage divider comprising four resistors 49, 50, 51 and 52 connected in series with one another, with the series combination connected across the X-ray tube 45. The junction between resistors 50 and 51 is grounded and the output of the voltage divider is taken across resistors 49 and 50. The output voltage of the voltage divider is coupled to a differential amplifier 53 (the output voltage of the voltage divider between resistors 49 and 50 is positive relative to ground, and the output voltage between resistors 51 and 52 is negative relative to ground) producing a signal proportional to the output voltage. The commanded voltage is compared to the signal proportional to the actual output voltage $E_o$ in a summer 58 to generate an error signal. The error signal is passed through a proportional plus integral regulator 60 to a limit circuit 62. The regulator 60 shown does not invert the signal. The limit circuit 62 assures that a lagging load is presented to the inverter by allowing the inverter to operate at or above the resonant frequency of the series resonant circuit. The output of the limit circuit is connected to a voltage controlled oscillator 64 which provides input signals to base driver 66 to alternately switch the transistors at opposite corners of the inverter 7.

Referring now to FIG. 1B, an equivalent circuit for the high voltage transformer 35 is shown. The equivalent circuit has a primary leakage inductance $L_p$ connected in series with a magnetizing inductance of the entire core referred to the primary, $L_m$. The magnetizing inductance $L_m$ is in parallel with the primary winding of an ideal transformer having two secondary windings. Connected in series with the first secondary winding is the leakage inductance of the first secondary $L_{s1}$ and the shunt capacitance of the first secondary $C_1$. Similarly, the leakage inductance of the second secondary winding $L_{s2}$ is in series with the shunt capacitance of the second secondary winding $C_2$. The effective shunt capacitance is defined as the sum of all distributed internal and external capacitances of a coil as reflected to the coil terminals. It is that capacitance which, when connected across an equivalent ideal coil of zero capacitance represents all of the capacitances of the real coil lumped into a single capacitance. The outputs of the equivalent circuit are available across each of the equivalent shunt capacitors $C_1$ and $C_2$, respectively.

The magnetizing inductance $L_m$ is much greater than the primary leakage inductance $L_p$ and secondary leakage inductances $L_{s1}$ and $L_{s2}$, respectively. When the secondary inductances are referred to the primary, (the transformer elements are referred to the primary side to determine the load presented to the inverter 7), the magnetizing inductance can be neglected leaving an equivalent circuit of leakage inductance of the primary in series with the parallel combination of the secondary inductance in series with the parallel combination of the shunt capacitors. Thus, the resonating circuit of FIG. 1A is realized with parasitic elements, with the transformer leakage reactances serving as the resonating inductor while the shunt capacitance serves as the resonating capacitance. When the secondary inductances are referred to the primary side their inductance values are divided by the square of the turns ratio. When the shunt capacitances are referred to the primary their capacitance values are multiplied by the square of the turns ratio of the transformer. In a step-up configuration shown, there would be a large turns ratio typically 100–200, for example, resulting in a large shunt capacitance referred to the primary.

Operation of the circuit of FIG. 1A will now be described. A commanded dc output voltage $E_o^*$ is compared in summer 58 to a signal proportional to the actual output voltage $E_o$ to develop an error signal. The error signal after passing through the proportional plus integral regulator circuit 60, is supplied to an input of the limit circuit 62. The limit circuit provides a maximum output signal in response to a minimum error signal. The maximum output signal of the limit circuit when provided to the voltage control oscillator 64 results in a signal supplied to the base drivers 66 which in turn switches the transistors 9, 11, 13 and 15 of the inverter 7. The inverter drives the series resonant circuit of parasitic elements of the transformer above its resonant frequency. As the error signal from summer 58 increases, in a positive direction, signifying a call for additional voltage step-up, the limit circuit 62 decreases the voltage supplied to the voltage control oscillator, thereby decreasing the frequency of the signal supplied to the parasitic resonant circuit causing the circuit to operate closer to its damped resonant frequency.

Referring to FIG. 2, the voltage ratio of the input voltage to the output voltage versus inverter frequency is shown for several normalized load impedances where the normalized load impedance $R_o'$ is expressed by the equation $$R_o' = \frac{R}{\sqrt{L/C}} \quad (1)$$

where R is the load resistance connected to the resonant circuit and L and C are the effective inductance and capacitance of the parasitic resonant circuit, respectively. An increase in the normalized resistance $R_o'$ results in a decrease in the damping since the load resistance is connected in parallel with the shunt capacitance of the resonant circuit. Maximum step-up occurs with minimum damping at the damped resonant frequency which is slightly lower than the resonant frequency of the parasitic circuit. The resonant frequency $F_o$ is defined by $$F_o = 1/(2\pi \sqrt{LC})  \qquad (2)$$

A resonant frequency ratio of 1 signifies that the actual frequency F which is in the numerator is equal to the resonant frequency $F_o$ in the denominator. The converter is capable of voltage step-up and voltage step-down operation dependent on the turns ratio and is always operated above the damped resonant frequency to assure that the parasitic resonant components present a lagging load to the inverter. The voltage developed across the individual energy storage elements in the series resonant circuit is dependent on the damping provided by the rectifier, filter and the tube, and the frequency of operation.

In a resonant circuit the voltage across one series energy storage element can be greater than the voltage across the series combination of the resonant circuit elements. High instantaneous voltages across the inductance and capacitance occur 180° out of phase with one another. The output voltage of the resonant circuit is taken across the equivalent shunt capacitance of the resonant circuit of the transformer parasitic series resonant circuit. The voltage step up and step down as plotted against resonant frequency ratio $F/F_o$ in FIG. 2 is measured across the capacitor in a series resonant circuit. The resonant rise in voltage across each of the reactive elements in the series resonant circuit for a given value of current is Q times the applied voltage. Q is the quality factor, a dimensionless ratio of the maximum energy stored to the energy dissipated per cycle, times a constant. The amount of voltage step-up provided by the converter is dependent on the step-up ratio of the transformer used and on the high voltages developed across the capacitor of the resonant circuit. The total step-up of the converter is the product of the turns ratio times the step up or step down due to the resonant circuit. Frequency control can result in a step-up greater or less than the turns ratio of the transformer 35 in the circuit of FIG. 1A. The closed loop control 47 adjusts the frequency at which the transistors are switched to achieve the voltage step-up needed to obtain the desired output voltage. Since the transformer is operating at frequencies much higher than 60 Hz, fast response to changes in commanded voltages can be achieved.

The gate drivers switch transistors at opposite corners of the inverter, resulting in square waves of voltage $V_{ab}$ supplied to the transformer primary as shown in FIG. 3A. The voltage across, and the current flowing in, a transistor in the circuit of FIG. 1A is shown in FIGS. 3B and 3C, respectively. The square waves of voltage from the inverter result in approximately sinusoidal currents flowing through the parasitic resonant circuit which should result in easier electromagnetic interference filtering. The current drawn by transformer 35 in the circuit of FIG. 1A is shown in FIG. 3D and the voltage waveform across a secondary of the transformer, which corresponds to the voltage across one of the capacitors in FIG. 1B, is shown in FIG. 3E. The parasitic resonant circuit of transformer 35 is driven at a frequency such that a lagging load is presented to the inverter between junctions a and b, that is, the current $i_c$ lags the voltage $V_{ab}$. The lagging load is obtained by operating the inverter at frequencies at or above the damped resonant frequency of the parasitic circuit.

The actual values of leakage inductance and shunt capacitance of high voltage, high turns ratio transformers can be determined after the transformers are built and the resonant frequency can then be determined from these measurements. The leakage inductance of the transformer can also be selected before building the transformer so that the leakage inductance (and hence leakage reactance), is a function of the geometry of the windings as well as the number of turns of the windings (leakage inductance increases as the square of the turns ratio). Leakage inductance can be increased by interposing a magnetic shunt between the primary and secondary of the transformer and by increasing the distance between primary and secondary windings. Shunt capacitance is also affected by the winding geometry. The winding geometry which provides minimum leakage inductance between two windings usually has the maximum shunt capacitance. Selection of the winding geometry and core structure can be used to provide particular values of leakage reactance and shunt capacitance which determine the resonant frequency and the frequency at or above which the circuit will operate. Capacitance is present due to the capacitance between the windings, of which they are a large number, and the multiplication of the secondary capacitances by the turns ratio when they are referred to the primary. The interconnection of the layers of windings in the transformer can be varied to adjust the distributed capacitance.

The switching recovery time of the transistors in the circuit of FIG. 1A limits the attainable switching frequencies. Higher frequencies (5-30 Kilohertz) permit smaller reactive components to be used.

Operating the inverter with a lagging load results in device current waveforms that are retarded in phase relative to the output voltage of the inverter more than can be achieved with a thyristor inverter since a thyristor inverter must supply a load with a leading power factor. When the load on the inverter is run at a lagging power factor, as in the present invention, current is present in each feedback diode at the instant its parallel-connected transistor turns on; therefore, there are no turn-on switching losses in the power switches. Also, since current is present in each feedback diode when its parallel-connected transistor turns on, a snubber capacitor can be connected directly across the transistor without need for a current limiting resistor in series with the capacitor, resulting in reduced turn off dissipation of the transistor and lossless snubber action.

Since the snubber action is lossless, relatively large snubbers can be used, which, in turn, results in low transistor power dissipation. The diodes in inverse parallel with the transistors can be of medium speed since there is no voltage increase immediately experienced by the diode after its turn-off. Rather, each transistor in parallel with a diode conducts, keeping the diode voltage low. Only after the transistor turns off is an increased voltage applied to the diode.

It is noted that the diodes in an SCR resonant inverter such as shown and described in U.S. Pat. No. 4,295,049 must be of high speed since the diagonally opposite SCR is turned on to commutate the diode which must turn off and block voltage. In order to protect the SCR and diode from di/dt related problems, small series inductances and device snubbers are needed.

Referring now to FIG. 4, a half bridge arrangement of the present invention is shown. DC input power obtained from an external source (not shown) is connected through an inductor 75 to a half bridge inverter 77 comprising two capacitors 79 and 81 connected in series across the positive and negative rails of the dc input power to establish a split power supply. Two series connected switches capable of conducting reverse current are connected between the positive and negative rails of the half bridge inverter 77. The choice of switches is the same as in the circuit of FIG. 1A. The switches shown are bipolar transistors 83 and 85 with inverse parallel diodes 87 and 89 connected across each switch, respectively. Lossless snubbers comprising capacitors 91 and 93 are each connected across the switches, respectively.

The output of the half bridge inverter is available across the junctions between the series connected capacitors 79 and 81 and the two series connected switches. Connected to the output of the half bridge inverter is a high frequency transformer 35 with two secondary windings 37 and 39, two diode bridges 41 and 43 and an X-ray tube 45 as in the circuit of FIG. 1A. The circuit of FIG. 4 is controlled in the same manner as the circuit of FIG. 1A except that half as many gate drivers are needed.

The operation of the circuit of FIG. 4 is the same as that for the circuit of FIG. 1A except that there are half as many switches and half as many gate drivers, but each of these devices must carry double current for the same output power. One half of the DC voltage from inductor 75 is applied to primary winding 33 as compared to the full bridge embodiment since the voltage between the capacitors 79 and 81 is fired at ½ the dc supply voltage. The circuit of FIG. 4 has the advantage of inherently blocking any dc offset voltage which may result from unequal conduction drops or switching times of the semiconductors since the load of the inverter is connected at one end between two series connected capacitors.

Figure 5:
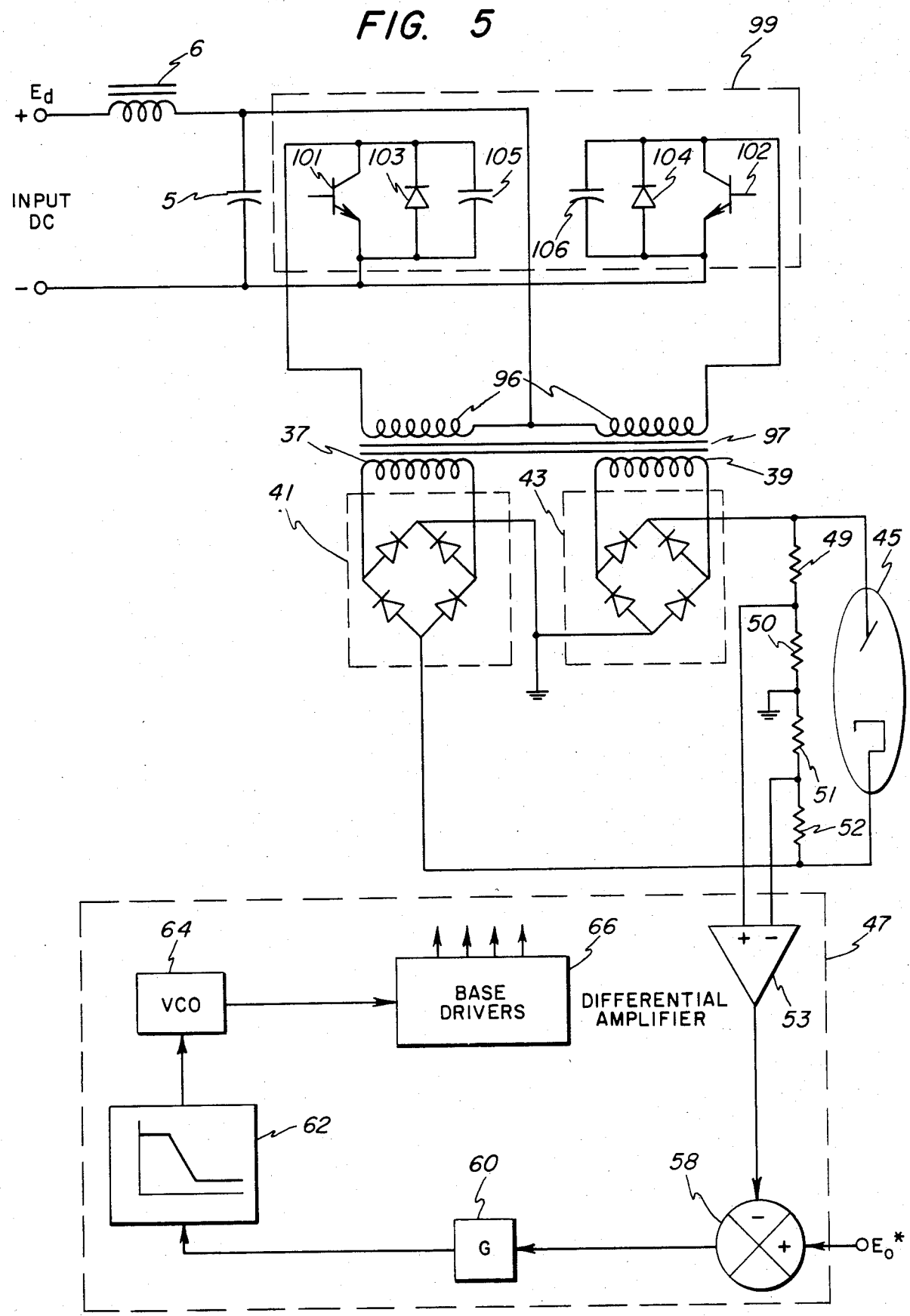
FIG. 5 is still another embodiment of the present invention utilizing a push-pull inverter.

FIG. 5 illustrates a push-pull embodiment of the present invention. The positive terminal of an external dc power supply (not shown) is connected through an inductor 6 to one side of high frequency filter capacitor 5, the other side of which is connected to the negative rail of the dc supply. Inductor 6 is connected to the center tap of a center tapped primary winding 96 of transformer 97. An inverter 99 has a first switch with reverse current carrying ability connected between the negative rail of the dc supply and one end of the primary winding 96 and a second switch connected between the negative rail of the dc supply and the other end of the primary winding 96. The choice of switching devices is the same as for the circuit of FIG. 1A. The first and second switches comprise bipolar transistors 101 and 102, respectively, each having a diode 103 and 104, connected across it in inverse parallel, respectively. A lossless snubber comprising a capacitor 105 is connected across switch 101 and a lossless snubber comprising a capacitor 106 is connected across switch 102. The secondary windings 17 and 39 of transformer 97 are connected as in the circuit of FIG. 1A with two full bridge diode rectifiers 41 and 43 and an X-ray tube. The control 47 in the circuit of FIG. 5 is the same as in the circuit of FIG. 1A except that only two gate drivers are needed.

The operation of the circuit of FIG. 5 is the same as that of the circuit of FIG. 1A, except that each switch has to block double the dc bus voltage. An advantage of the circuit of FIG. 5 is the common connection point of the switches which eliminates the necessity for transformer coupling or opto-isolation between the base drivers and the switches.

FIG. 6 illustrates another embodiment of the present invention, which can supply two ranges of input voltage to a transformer primary winding. An external ac supply (not shown) is connected to a full bridge rectifier 111. The positive dc output of the rectifier is connected through an inductive filter 6 to a first capacitor 113 which is connected in series with a second capacitor 115. The second capacitor is connected to the negative output of the full bridge rectifier 111. Connected across the two capacitors is a full bridge inverter 117 having four switches with reverse current blocking ability. Each switch comprises a bipolar transistor 119, 120, 121 and 122 with an inverse parallel diode 123, 124, 125 and 126 connected across each transistor, respectively. Transistors 119 and 120 are connected in series in a first leg of inverter 117 and transistors 121 and 122 are connected in series in a second leg of the inverter. Lossless snubbers comprising capacitors 127, 128, 129 and 130 are connected across each transistor, respectively. The normally-open contacts 131 of a relay are connected across the junctions between the capacitors 113 and 115 and between transistors 119 and 120 of the first inverter leg. The output of the inverter 117 is available across the junctions between transistors 119 and 120, and between transistors 121 and 122. The output of the inverter is connected to the high frequency transformer primary as in the circuit of FIG. 1A.

A switch 135 is connected in series with a pull up resistor 137. An external logic power source (not shown) provides an enabling signal to AND gates 139 and 141 when switch 135 is open, permitting a transistor switching signal from the base drives to be connected through AND gate 139 to switch transistor 119 and switching signal connected through AND gate 141 to switch transistor 120. When switch 135 is open, a signal inverter 143 keeps coil driving transistor 145 biased out of conduction. When switch 135 is closed, AND gates 139 and 141 are disabled, preventing transistors 119 and 120 from receiving switching signals. Signal inverter 143 provides a logical one to the base of coil driving transistor 145 which in turn energizes the relay coil 131a by permitting power to flow from an external power source through the relay coil and through the transistor 145. Energizing the relay coil 131a causes its associated contacts 131 to close. A transient suppression network comprising a resistor 147 and a diode 149 is connected across the relay coil to provide a path for decay current when transistor 145 is turned off. Switch 131 can alternately be implemented with a triac using suitable control circuitry. The circuit of FIG. 6 is controlled in the same manner as the circuit of FIG. 1A except that closing switch 135 disables the base signals to transistor 119 and 120.

Operation of FIG. 6 will now be explained. In X-ray generator applications, a 6:1 voltage range adjustment is typically needed. The range may be achieved through frequency control alone by going to a higher frequency to reduce the voltage (see FIG. 2) or, if it is desired to limit the upper frequency of operation, it is possible to adjust the input voltage to different levels. The X-ray exposure is determined prior to turning on the power supply. Therefore the relay contacts 131 do not have to make or break current since it is set by closing switch 135 before circuit operation commences. With the switch 135 placed in the closed position, relay coil 131a is energized, closing contacts 131, so that the transistors 119 and 120 are not switched by the control circuit and the inverter operates as a half bridge inverter with only one-half the dc input voltage applied to the transformer primary 33. With the switch 131 in the open position, the circuit operates with a full bridge inverter with all transistor switches operating and the full dc input voltage applied to the transformer primary 33. Thus two ranges of output voltage are possible.

The foregoing describes a high frequency dc to dc converter which can achieve step-up and step-down operation with greatly reduced switching losses, fast speed of response and fewer power components at a lower weight than conventional 60 Hz supplies.

While the invention has been particularly shown and described with reference to several preferred embodiments thereof, it will be understood by those skilled in the art that various changes in form and details may be made without departing from spirit and scope of the invention.

What is claimed is:

1. A dc-dc step-up converter for supplying two ranges of high voltage dc to a load comprising:
    a full bridge voltage inverter having a first and second leg, each leg having two series-connected controllable switch means with reverse current carrying ability; said inverter adapted to be coupled to external dc source;
    two series-connected capacitors connected in parallel with said first leg;
    circuit means for connecting the junction of said two capacitors to the junction of the two switch means in said first leg and bypassing said switch means in said first leg to obtain a first range of output voltage and disconnecting the junctions and allowing operation of said switch means to obtain the second range of output voltage;
    a step-up transformer receiving ac power from said voltage inverter said transformer coupled to the output of said inverter;
    rectifying means connected to the output of said transformer for rectifying the output voltage of said transformer and supplying stepped up dc voltage to the load; and
    control means coupled to said rectifying means and each of said switch means, and responsive to said load voltage and to a voltage magnitude command for providing a frequency command to said inverter to adjust the input frequency to said transformer and thereby vary the output voltage, the frequencies provided to the transformer being selected to cause the transformer shunt capacitance and leakage reactance to act as a series resonant circuit and resonate at or above the damped resonant frequency of the series resonant circuit to achieve voltage step up due to the resonant rise of voltage across the shunt capacitance of the resonant circuit as well as the transformer turns ratio.

2. The dc-dc converter of claim 1 wherein said inverter comprises switches with gate turn-off capability.

3. The dc-dc converter of claim 10 wherein said switches with gate turn-off capability comprise transistors each with an inverse parallel connected diode.

4. The dc-dc converter of claim 2 wherein said transformer comprises a primary winding magnetically coupled to two secondary windings.

5. The dc-dc converter of claim 4 wherein said rectifier means comprises two rectifier means, one rectifier means being connected to each of said secondary windings, the output of said rectifier means connected in series and the junction of said rectifiers being grounded.

6. The dc-dc converter of claim 2 wherein said control means comprises means for providing a signal proportional to the output voltage of the converter, means for comparing the commanded output voltage to the signal proportional to the output voltage to develop an error signal, limit circuit means receiving said error signal, a voltage controlled oscillator responsive to the output signal of said limit circuit means and base driver means responsive to the output frequency of said voltage control oscillator for providing switching signals to said inverter switches.

* * * * *